United States Patent
Fuhry et al.

(10) Patent No.: US 9,434,828 B2
(45) Date of Patent: *Sep. 6, 2016

(54) NON-AQUEOUS DISPERSIONS COMPRISING A NONLINEAR ACRYLIC STABILIZER

(75) Inventors: Mary Ann M. Fuhry, Butler, PA (US); David Fenn, Allison Park, PA (US); John M. Dudik, Apollo, PA (US); Linda K. Anderson, Allison Park, PA (US); Wei Wang, Allison Park, PA (US); Dennis A. Simpson, Sarver, PA (US); Scott Moravek, Cranberry Township, PA (US); Ken W. Niederst, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 895 days.

This patent is subject to a terminal disclaimer.

(21) Appl. No.: 12/963,045

(22) Filed: Dec. 8, 2010

(65) Prior Publication Data

US 2012/0149820 A1 Jun. 14, 2012

(51) Int. Cl.
*C09D 133/08* (2006.01)
*C09D 133/10* (2006.01)
*C09D 4/02* (2006.01)
*C08J 7/04* (2006.01)
*C09D 7/12* (2006.01)
*C09D 7/00* (2006.01)

(52) U.S. Cl.
CPC ............... *C08J 7/047* (2013.01); *C09D 7/001* (2013.01); *C09D 7/125* (2013.01); *C08J 2433/12* (2013.01); *C09D 133/08* (2013.01); *C09D 133/10* (2013.01)

(58) Field of Classification Search
CPC ..... C09D 133/08; C09D 7/001; C09D 7/125
See application file for complete search history.

(56) References Cited

U.S. PATENT DOCUMENTS

| | | |
|---|---|---|
| 3,779,977 A | 12/1973 | Hicks |
| 3,926,899 A | 12/1975 | Nordberg |
| 4,290,932 A | 9/1981 | Wright et al. |
| 4,403,003 A | 9/1983 | Backhouse |
| 4,746,714 A | 5/1988 | Spinelli et al. |
| 4,777,200 A | 10/1988 | Dymond et al. |
| 4,833,177 A | 5/1989 | Faler et al. |
| 5,010,140 A | 4/1991 | Antonelli et al. |
| 5,066,698 A | 11/1991 | Hazan et al. |
| 5,162,426 A | 11/1992 | Hazan et al. |
| 5,244,959 A | 9/1993 | Hazan et al. |
| 5,250,605 A | 10/1993 | Hazan et al. |
| 5,252,660 A | 10/1993 | Hazan et al. |
| 5,306,744 A | 4/1994 | Wolfersberger et al. |
| 5,340,871 A | 8/1994 | Pearson et al. |
| 5,348,992 A | 9/1994 | Pearson et al. |
| 5,391,620 A | 2/1995 | Bederke et al. |
| 5,494,954 A | 2/1996 | Das et al. |
| 5,661,199 A * | 8/1997 | Bederke et al. ............. 523/206 |
| 5,695,919 A * | 12/1997 | Wang et al. ............... 430/527 |
| 5,763,528 A | 6/1998 | Barsotti et al. |
| 6,372,840 B1 | 4/2002 | Shalati et al. |
| 7,534,832 B2 | 5/2009 | Ahn et al. |
| 7,825,173 B2 | 11/2010 | Willems et al. |
| 2002/0165296 A1* | 11/2002 | Cruz .................... C08F 220/18 523/201 |
| 2004/0132895 A1 | 7/2004 | Ambrose et al. |
| 2008/0202382 A1 | 8/2008 | Carlblom et al. |
| 2010/0093914 A1 | 4/2010 | Yukawa et al. |

FOREIGN PATENT DOCUMENTS

| | | |
|---|---|---|
| EP | 0342996 A2 | 11/1989 |
| EP | 0171235 B1 | 4/1992 |
| GB | 1409719 | 10/1975 |
| GB | 1444353 | 7/1976 |
| GB | 2060657 A | 5/1981 |
| JP | 59149959 A | 8/1984 |
| JP | 59179548 A | 10/1984 |
| JP | 59179549 A | 10/1984 |
| JP | 59179550 A | 10/1984 |
| JP | 59210920 A | 11/1984 |
| JP | 59226061 A | 12/1984 |
| JP | 6279508 A | 10/1994 |
| JP | 2002035677 A | 2/2002 |
| JP | 2002035678 A | 2/2002 |
| JP | 2007111665 A | 5/2007 |
| WO | 92/05225 | 4/1992 |
| WO | 93/13111 | 7/1993 |
| WO | 9527012 | 10/1995 |
| WO | 0109231 | 2/2001 |
| WO | 0172909 | 10/2001 |

* cited by examiner

Primary Examiner — Karuna P Reddy
(74) Attorney, Agent, or Firm — Diane R. Meyers

(57) ABSTRACT

A non-aqueous dispersion comprising the dispersion polymerization reaction product of an ethylenically unsaturated monomer and a nonlinear, random acrylic polymer stabilizer is disclosed. Related coatings, methods, and substrates are also disclosed.

15 Claims, No Drawings

NON-AQUEOUS DISPERSIONS COMPRISING A NONLINEAR ACRYLIC STABILIZER

FIELD OF THE INVENTION

The present invention relates to a non-aqueous dispersion comprising the dispersion polymerization reaction product of an ethylenically unsaturated monomer and a nonlinear, random acrylic stabilizer.

BACKGROUND INFORMATION

Non-aqueous dispersions are known, as are microparticles produced by non-aqueous dispersion techniques. Typically, non-aqueous dispersions are prepared by the free radical addition polymerization of ethylenically unsaturated monomers in a hydrocarbon rich dispersing medium. The polymerization is carried out in the presence of a steric stabilizer, a portion of which is soluble in the dispersing medium and a portion of which is associated with the dispersed phase; the dispersed phase is insoluble in the dispersing medium. The steric stabilizer can be physically or chemically bound to the dispersed phase. The portion of the steric stabilizer that is soluble in the dispersing medium is typically aliphatic polyester such as poly(12-hydroxystearic acid). The poly(12-hydroxystearic acid) can be converted to a macromonomer by reaction of the terminal carboxylic acid group with the epoxy group of glycidyl methacrylate. The macromonomer can be used directly as a stabilizer, in which case it will copolymerize with the monomers that form the dispersed phase, or it can be copolymerized with acrylic monomers in solution to form a comb polymer having aliphatic side chains that are soluble in the continuous phase and a polar acrylic backbone that is insoluble in the continuous phase. Alternatively, the soluble portion of the steric stabilizer can be derived from a macromonomer produced from aliphatic acrylic monomer such as ethylhexyl methacrylate or lauryl methacrylate. There are several drawbacks with non-aqueous dispersions produced using these types of stabilizers due to the large difference in polarity, compatibility and solubility characteristics between the stabilizer and the dispersed polymer. The non-aqueous dispersions can become unstable if polar solvents are added, because the stabilizing segment becomes less soluble as the polarity of the continuous phase increases. If the non-aqueous dispersions are used in coatings, any fraction of the steric stabilizer that does not remain associated with the dispersed polymer during film formation may become incompatible. It may form a film at the interface between the substrate and other coating layers, leading to loss of adhesion, or it may form regions of high concentration within the coating leading to defects such as craters. Non-aqueous dispersions that are not as dependent on the solubility difference between the stabilizer and the dispersed phase are desirable.

SUMMARY OF THE INVENTION

The present invention is directed to a non-aqueous dispersion comprising the dispersion polymerization reaction product of an ethylenically unsaturated monomer and a nonlinear, random, acrylic polymer stabilizer.

DETAILED DESCRIPTION OF THE INVENTION

The present invention is generally directed to non-aqueous dispersions comprising a nonlinear, random, acrylic stabilizer. As used herein, the term "nonlinear" means that there is at least one branch point along the backbone of the polymer. In some cases, there may be multiple branch points (i.e. "hyperbranched"), and in some embodiments, the branches can form connections between polymer chains (i.e. internal crosslinks). It will be appreciated that polymer branching can be quantified using the Mark-Houwink parameter. In certain embodiments, the Mark-Howink parameter of the present nonlinear acrylic stabilizers as measured by triple detector GPC is 0.2-0.7, such as 0.3-0.6.

The nonlinear stabilizer is "random" or predominantly homogenous. That is, the polymer is substantially free of blocks or segments having distinct composition from the remainder of the polymer. For example, in a typical "comb" polymer, the backbone of the polymer has one composition, while the "teeth" of the comb have another. That is not the case with a random or homogenous polymer in which the monomers are allowed to react freely and are not reacted in a predetermined pattern or order. As a result, the monomers are randomly assembled in the final polymer.

The term "acrylic stabilizer" as used in the context of the present invention refers to a polymer that comprises 50 weight % or greater acrylic monomers. In certain embodiments, the present nonlinear acrylic stabilizers comprise 75 weight % or greater, such as 90 weight % or greater or 95 weight % or greater of acrylic monomers. In certain embodiments the stabilizer comprises 100 weight % acrylic monomers. In certain embodiments, the stabilizer comprises polar acrylic monomers, such as hydroxyl functional acrylic monomers, in an amount of 30 wt % or less, such as 20 wt % or less, 15 wt % or less or 10 wt % or less. In other embodiments, the stabilizer comprises nonpolar acrylic monomers, such as 2-ethyl hexyl acrylate, which can be in amounts of 50 weight % or greater, such as 60 weight % or greater, 70 weight % or greater or 80 weight % or greater. Weight %, as used in the context of weight % of monomers, refers to the weight % of monomers used in the formation of the stabilizer, and does not include other ingredients, such as initiators, chain transfer agents, additives and the like, used to form the stabilizer. "Acrylic" monomers refers generally to acrylics, methacrylics, styrene and any derivatives of any of these.

The nonlinear acrylic stabilizer can be prepared by reacting two or more coreactive monomers, such as glycidyl methacrylate and acrylic acid, or by preparing an acrylic polymer with functional groups and crosslinking the functionality, such as by making a hydroxyl functional polymer and reacting it with a diisocyanate or an epoxy functional polymer and reacting it with a diacid. In a particularly suitable embodiment, the nonlinear acrylic stabilizer can comprise a polyfunctional ethylenically unsaturated monomer (that is, a residue thereof). Suitable monomers include allyl(meth)acrylate, alkane diol di(meth)acrylates such as hexane diol diacrylate or ethylene glycol dimethacrylate, trimethylol propane triacrylate, and divinylbenzene. As used herein, and as is conventional in the art, the use of (meth) in conjunction with another word, such as acrylate, refers to both the acrylate and the corresponding methacrylate.

It will be appreciated by those skilled in the art that the use of a polyfunctional ethylenically unsaturated monomer in the formation of the acrylic stabilizer allows for nonlinearity to be achieved. Typically, the polyfunctional monomer will be used in a weight % of 0.1 to 10, such as 0.25 to 5 or 0.5 to 2 based on total weight of monomers used in the stabilizer. If the polyfunctional monomer is used in amounts too high, gelling can occur. The level of polyfunctional monomer can be chosen so as to give the desired amount of nonlinearity or branching without gelling the product. One or more polyfunctional ethylenically unsaturated monomers can be used. In some embodiments, the two (or more) ethylenically unsaturated functional groups within the same monomer molecule may have different reactivities towards the other (meth)acrylate monomers used to form the stabilizer. Each polyfunctional ethylenically unsaturated monomer molecule may react completely with other (meth)acrylate monomers to form branch points/crosslinks, or it may react incompletely and retain at least one of its ethylenically unsaturated functional groups. Accordingly, the resulting nonlinear acrylic stabilizer will also typically have ethylenic unsaturation. This unsaturation is then available to react during the preparation of the non-aqueous dispersion, allowing the nonlinear acrylic stabilizer to be covalently bonded to the dispersed phase polymer. For example, the unsaturated stabilizer can copolymerize with the ethylenically unsaturated monomers to form the present non-aqueous dispersions, as further described below.

In the formation of the nonlinear acrylic stabilizer, the polyfunctional monomer will be polymerized with one or more additional ethylenically unsaturated monomers and an initiator, such as a free radical initiator. Suitable monomers include methyl (meth)acrylate, ethyl(meth)acrylate, n-butyl (meth)acrylate, isobutyl(meth)acrylate, 2-ethylhexyl(meth) acrylate, isobornyl(meth)acrylate, 2-hydroxyethyl(meth) acrylate, 2-hydroxypropyl(meth)acrylate, (meth)acrylic acid, glycidyl(meth)acrylate, styrene, alpha-methylstyrene, lauryl(meth)acrylate, stearyl(meth)acrylate, itaconic acid and its esters, and the like. As noted above, 50 weight % or greater of the monomers used in the formation of the stabilizer are acrylic. Suitable free radical initiators include peroxy initiators such as benzoyl peroxide, lauroyl peroxide, or tert-butylperoxy-2-ethyl-hexanoate (tert-butylperoctoate) and azo initiators such as 2,2'-azobis(2,4-dimethylpentane nitrile) or 2,2'-azobis(2-methylbutane nitrile).

Generally, the nonlinear acrylic stabilizers are formed by solution polymerization of the ethylenically unsaturated monomers, at least one of which is polyfunctional, by a standard radical polymerization method known to those skilled in the art. For example, the ethylenically unsaturated monomers can be added over a period of time to a suitable solvent at an elevated temperature, such as at the reflux temperature of the solvent. A radical initiator, such as a peroxide initiator, is added to the reaction mixture over approximately the same time period. The initiator is chosen so that it will induce radical polymerization of the monomers at the selected reaction temperature. After the monomers and initiator have been added to the reaction mixture, the mixture may be held at the reaction temperature for an extended period of time, during which additional initiator may be added to ensure complete conversion of the monomers. Progress of the reaction may be monitored by solids measurement, or by gas chromatography.

In certain embodiments, the stabilizer can be prepared in a continuous reactor. For example, (meth)acrylate monomers and a radical initiator, such as a peroxide initiator, can be fed continuously through a continuous reactor with a c1 to 20 minute residence time at 150-260° C. The (meth) acrylate monomers used herein could be polar, non-polar, or a mixture of both types.

In certain embodiments, the molar ratio of acrylate to methacrylate can be about 2:1. In other embodiments, the initiator level is 0.5 to 2.0%, such as 1.0 to 1.5% based on the total weight of the monomers.

The stabilizer can have a weight average molecular weight as measured by gel permeation chromatography relative to linear polystyrene standards of 10,000 to 1,000,000, such as 20,000 to 80,000, or 30,000 to 60,000. The stabilizer may comprise ethylenic unsaturation, as detected by $^{13}$C NMR spectroscopy. The stabilizer can contain functional groups, such as hydroxyl groups, carboxylic acid groups, and/or epoxy groups.

The acrylic stabilizer will generally be compatible with the continuous phase of the non-aqueous dispersion. For example, the solubility parameters of the stabilizer and the solvent should be similar. In certain embodiments, the van Krevelen solubility parameter of the stabilizer at 298 K is 17 to 28 MPa^0.5, such as 17.5 to 20 MPa^0.5 or 18 to 19 MPa^0.5. In the case of a copolymer, the solubility parameter can be calculated from the weighted average of the van Krevelen solubility parameter of the homopolymers derived from the individual monomers. The van Krevelen solubility parameter for a homopolymer is calculated using Synthia implemented in Material Studio 5.0, available from Accelrys, Inc., San Diego, Calif.

In the present invention, the stabilizer is further reacted with a monomer or a mixture of monomers comprising ethylenic unsaturation. These monomers are sometimes referred to herein as the "core monomers", as distinguished from the monomers used in the stabilizer. The core monomer(s) and the stabilizer react through the ethylenic unsaturation by dispersion polymerization techniques, which are known to those skilled in the art. For example, the stabilizer may be dissolved in a suitable solvent or mixture of solvents, and the monomer(s) may be added to the solution at an elevated temperature over a period of time, during which a radical initiator is also added to the mixture. The monomer(s) may be added in a single timed feed, or they may be added in stages, such as in two stages. The composition of the monomers may be the same or different when added either at the same time or different times.

Suitable core monomers include methyl(meth)acrylate, ethyl(meth)acrylate, n-butyl(meth)acrylate, isobutyl(meth) acrylate, 2-ethylhexyl(meth)acrylate, isobornyl (meth)acrylate, 2-hydroxyethyl(meth)acrylate, 2-hydroxypropyl(meth) acrylate, (meth)acrylic acid, glycidyl(meth)acrylate, styrene, alpha-methylstyrene, lauryl (meth)acrylate, stearyl (meth)acrylate, itaconic acid and its esters, and the like. In certain embodiments the monomers comprise a polyfunctional ethylenically unsaturated monomer, such as hexanediol diacrylate, ethylene glycol dimethacrylate, trimethylol propane triacrylate, divinylbenzene, or other suitable poly (meth)acrylate.

In addition to the solubility parameters of the stabilizer and the core, the appropriate solubility parameter of the solvent should also be considered. Solubility parameters for solvents can be obtained from "Hansen solubility parameters: a user's handbook", Charles M. Hansen, CRC Press, Inc., Boca Raton, Fla., 2007. In certain embodiments, the solubility parameter of the solvent is lower than that of the core monomers, such as a difference of 3 units or greater, or 3.8 units or greater; if there is less than a 3 unit difference the core monomers may be too soluble in the continuous phase and microparticles may not readily form. As used in reference to solubility parameter, "units" refers to MPa^0.5. The solubility parameter of a mixture of solvents can be calculated from the weighted average of the solubility parameter of the individual solvents. In certain embodiments, the solubility parameter of the solvent should be lower than that of the stabilizer, such as a difference of 3 units or less, or 2.5 units or less; if the difference is more than 3 units, then the stabilizer may not be soluble in the solvent.

The non-aqueous dispersions of the present invention may comprise functionality, such as hydroxyl functionality. In certain embodiments, the theoretical hydroxyl value can be from 40 to 350, such as from 60 to 280, or from 100 to 280. The non-aqueous dispersions of the present invention may further comprise acid functionality. In certain embodiments, the theoretical acid value may be from 0 to 80, such as from 5 to 80 or 10 to 80.

It will be appreciated by those skilled in the art that the reaction of the core monomer(s) with the stabilizer will result, in certain embodiments, in a microparticle. The weight average molecular weight of the non-aqueous dispersion as measured by gel permeation chromatography against a linear polystyrene can be very high, such as 100,000 g/mol, or can be so high as to be immeasurable due to gel formation within the particle. In certain embodiments, having microparticles with high gel content may, when used in a coating, contribute to one or more enhanced properties, such as improved appearance, resistance to solvents, acids and the like, improved sag resistance, improved metallic flake orientation, and/or improved resistance to interlayer mixing when multiple coating layers are applied. In certain embodiments, the gel content of the dispersion as measured by the ultracentrifuge separation method is 30 weight percent or greater, such as 40 weight percent or greater, with weight percent based on total solid weight. In the ultracentrifuge separation method on which these values are based, 2 grams of the dispersion is added into a centrifuge tube and then the tube is filled with 10 grams of a solvent such as tetrahydrofuran (THF), and the materials are mixed thoroughly. The prepared centrifuge tube is placed in an ultracentrifuge at a speed at 50,000 rpm or greater, for 30 min or longer. The undissolved fraction of the dispersion is separated and dried to constant weight at 110° C. to provide the gel content of the dispersion.

The non-aqueous dispersions of the present invention may be internally crosslinked or uncrosslinked. Crosslinked non-aqueous dispersions may be desired in certain embodiments over uncrosslinked non-aqueous dispersions because uncrosslinked materials are more likely to swell or dissolve in the organic solvents that are commonly found in many of the coating compositions to which the dispersions are subsequently added. Crosslinked non-aqueous dispersions may have a significantly higher molecular weight as compared to uncrosslinked dispersions. Crosslinking of the non-aqueous dispersion can be achieved, for example, by including a polyfunctional ethylenically unsaturated monomer (or a crosslinking agent) with the ethylenically unsaturated monomer or monomer mixture during polymerization. The polyfunctional ethylenically unsaturated monomer can be present in amounts of 0 to 20% by weight based on the total weight of monomers used in preparing the non-aqueous dispersion, such as from 1 to 10% by weight.

In certain embodiments, the core monomer dispersion polymerized with the acrylic stabilizer comprises less than 90% by weight of a polar and/or functional monomer. The term "polar" as used herein refers to acrylic monomers or compounds that have a solubility parameter (van Krevelen) at 298 K of 19 MPa^0.5 or more. Conversely, the term "non-polar" describes substances that have a solubility parameter (van Krevelen) at 298 K lower than 19 MPa^0.5.

Any of the non-aqueous dispersions described herein can further include a continuous phase, sometimes referred to as a dispersing medium or carrier. Any suitable carrier can be used including an ester, ketone, glycol ether, alcohol, hydrocarbon or mixtures thereof. Suitable ester solvents include alkyl acetates such as ethyl acetate, n-butyl acetate, n-hexyl acetate, and mixtures thereof. Examples of suitable ketone solvents include methyl ethyl ketone, methyl isobutyl ketone, and mixtures thereof. Examples of suitable hydrocarbon solvents include toluene, xylene, aromatic hydrocarbons such as those available from Exxon-Mobil Chemical Company under the SOLVESSO trade name, and aliphatic hydrocarbons such as hexane, heptanes, nonane, and those available from Exxon-Mobil Chemical Company under the ISOPAR and VARSOL trade names. In certain embodiments the carrier is volatile. In certain other embodiments the carrier is not an alkyd and/or any other fatty acid containing compound.

It will be appreciated by those skilled in the art that the non-aqueous dispersions of the present invention are distinct from latex, which are aqueous dispersions. The present non-aqueous dispersions are also distinct from solution polymers, in that the non-aqueous dispersions have a dispersed phase that is different from the continuous phase, while a solution polymer has a single, homogeneous phase. A "non-aqueous dispersion" as used herein is one in which 75% or greater, such as 90% or greater, or 95% or greater of the dispersing media is a non-aqueous solvent, such as any of those listed above. Accordingly, a non-aqueous dispersion can still comprise some level of aqueous material, such as water.

Any of the non-aqueous dispersions described herein can be further used in a coating. Accordingly, the present invention is further directed to a coating comprising a non-aqueous dispersion comprising a nonlinear, random acrylic polymer stabilizer.

The non-aqueous dispersions of the present invention can form part of the coating film. In some embodiments, the non-aqueous dispersion can be the main film former, while in other embodiments it can be used as an additive. In some embodiments the non-aqueous dispersion is not crosslinked and becomes part of a thermoplastic or thermoset film upon drying. In other embodiments the non-aqueous dispersion may be crosslinked into the film to form a thermoset coating as discussed below.

The coating compositions can further comprise a crosslinking agent. In certain embodiments, the crosslinking agent will react with the non-aqueous dispersions to form a film forming resin. Suitable crosslinking agents can be chosen by those skilled in the art based upon the chemistry of the non-aqueous dispersion and may include, for example, aminoplast crosslinkers, phenolic crosslinkers, blocked or unblocked isocyanates and 1,3,5-triazine carbamate Aminoplast crosslinkers can be melamine based, urea based or benzoguanamine based. Melamine cross linkers are widely commercially available, such as from Cytec Industries, Inc., in their CYMEL line. Phenolic crosslinkers include, for example, novolacs and resoles. For use on food cans, phenolic resoles that are not derived from bisphenol A are particularly suitable.

It will be appreciated that in certain embodiments the non-aqueous dispersion of the present invention and crosslinker therefor can form all or part of the film-forming resin of the coating. In certain embodiments, one or more additional film-forming resins are also used in the coating. The additional film-forming resin can be selected from, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. The additional film-forming resin may be thermosetting or thermoplastic. In embodiments where the additional film-forming resin is thermosetting, the coating composition may further comprise a crosslinking agent that may be selected from any of the crosslinkers described above. The crosslinker may be the same or different from the crosslinker that is used to crosslink the non-aqueous dispersion. In certain other embodiments, a thermosetting film-forming polymer or resin having functional groups that are reactive with themselves are used; in this manner, such thermosetting coatings are self-crosslinking. The coating compositions may be solvent-based liquid compositions.

The coating compositions of the present invention can also comprise any additives standard in the art of coating manufacture including colorants, plasticizers, abrasion-resistant particles, film strengthening particles, flow control agents, thixotropic agents, rheology modifiers, catalysts, antioxidants, biocides, defoamers, surfactants, wetting agents, dispersing aids, adhesion promoters, clays, hindered amine light stabilizers, UV light absorbers and stabilizers, a stabilizing agent, fillers, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

The coatings of the present invention may comprise 1 to 95, such as 5 to 25, 5 to 90, 20 to 90 or 60 to 80 weight %, with weight % based on total solid weight of the coating, of the non-aqueous dispersion of the present invention. The coating compositions of the present invention may also comprise 0 to 50, such as 5 to 40 or 10 to 30 weight %, with weight % based on total solids weight of the coating, of a crosslinker for the non-aqueous dispersion. Additional components, if used, may comprise up to 60 weight %, such as up to 40 weight %, with weight % based on total solids weight of the coating.

In certain embodiments, the coatings of the present invention have high flexibility. By high flexibility is meant that the coated substrate can be bent, formed and/or drawn and the coating will remain intact; that is, it will not substantially crack, split and/or delaminate from the substrate. The flexibility of the coating can be measured, for example, by the wedge bend test method as described in the examples. It has been surprisingly discovered that in certain embodiments flexibility is high as compared to other acrylic systems, which are not typically known to have good wedge bend flexibility.

In certain embodiments of the present invention, the non-aqueous dispersion and/or coating comprising the non-aqueous dispersion are substantially epoxy-free. As used herein, the term "substantially epoxy-free" means that the non-aqueous dispersion and/or coating comprising the same are substantially free from epoxy, epoxy residue, oxirane rings or residues of oxirane rings. In certain other embodiments of the present invention, the non-aqueous dispersion and/or coating comprising the same are substantially free from bisphenol or residues or adducts thereof ("substantially bisphenol free"), including bisphenol A, BADGE or adducts of BADGE, bisphenol F, BFDGE or adducts of BFDGE. The non-aqueous dispersion and/or the coatings comprising the same can also be substantially free of polyvinyl chloride or related halide-containing vinyl polymers. "Substantially free" means that the non-aqueous dispersion and/or coating comprises 10 weight % or less, such as 5 weight % or less, 2 weight % or less or 1 weight % or less, based on total solids weight, of the compounds in any of the forms listed herein or otherwise known. Thus, it will be understood that non-aqueous dispersions and/or coatings according to the present invention can comprise trace or minor amounts of these components and still be "substantially free" of them. In yet other embodiments, the non-aqueous dispersion and/or coatings comprising the same are completely free of any of the compounds listed above, or derivatives thereof.

In certain embodiments, the present non-aqueous dispersions and/or coatings are substantially free of one or more of: fatty acid residues, other long chain hydrophobic groups, and/or aliphatic groups greater than C12 aliphatic groups; polyurethane; melamine formaldehyde such as alkylated melamine formaldehyde; siloxanes; and/or silanes such as acrylosilane and/or alkoxysilane. In yet other embodiments, the non-aqueous dispersion and/or coatings comprising the same are completely free of one or more of any of the compounds listed above or derivatives thereof.

The present coatings can be applied to any substrates known in the art, for example, automotive substrates, industrial substrates, packaging substrates, architectural substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, tin free steel, black plate, chromium passivated steel, galvanized steel, aluminum, aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and other non-metallic substrates. The substrate can be one that has been already treated in some manner, such as to impart visual and/or color effect.

The coatings of the present invention can be applied by any means standard in the art, such as electrocoating, spraying, electrostatic spraying, dipping, rolling, brushing, and the like.

The coatings can be applied in certain embodiments to a dry film thickness of 0.04 mils to 4 mils, such as 0.3 to 2 or 0.7 to 1.3 mils. In other embodiments the coatings can be applied to a dry film thickness of 0.1 mils or greater, 0.5 mils or greater 1.0 mils or greater, 2.0 mils or greater, 5.0 mils or greater, 10.0 mils or greater or even thicker. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the coatings described herein can be either one component ("1K"), or multi-component compositions such as two component ("2K") or more. A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be multi-component coatings, which will be understood as coatings in which various components are maintained separately until just prior to application. As noted above, the present coatings can be thermoplastic or thermosetting.

In certain embodiments, the coating is a clearcoat. A clearcoat will be understood as a coating that is substantially transparent. A clearcoat can therefore have some degree of color, provided it does not make the clearcoat opaque or otherwise impede, to any significant degree, the ability to see the underlying substrate. The clearcoats of the present invention can be used, for example, in conjunction with a pigmented basecoat. The clearcoat can be formulated as is known in the coatings art. In certain embodiments the clearcoat can comprise 0.1 to 90 weight % of the present non-aqueous dispersion, such as 0.5 to 50 weight % or 5 to 15 weight %, with weight % based on the weight of total solids.

In certain embodiments, the coating is used as a primer, such as an anti-chip primer. Anti-chip primer coating compositions are known in the automotive OEM industry, and are generally applied onto various locations of a vehicle such as the leading edges of doors, fenders, hoods and on the A pillar of a vehicle prior to application of a primer-surfacer coating composition over the entire vehicular body. In certain embodiments, the anti-chip primer coating composition is not cured prior to application of one or more subsequent coating layers. Rather, the anti-chip primer coating composition is subjected to an ambient flash step, wherein it is exposed to ambient air for a certain period of time in order to allow for the evaporation of a portion of organic solvent from the anti-chip coating composition. Cure of the anti-chip primer coating composition occurs simultaneously with the one or more additional coating layers (co-cured). Primers according to the present invention, including anti-chip primers, will typically comprise some colorant and will typically be used with one or more additional coating layers such as after an electrocoat layer and before a primer surface layer, a colored basecoat layer a clearcoat layer and the like.

In certain other embodiments the coating comprises a colorant, such as a pigmented basecoat used in conjunction with a clearcoat, or as a pigmented monocoat. Such coating layers are used, for example, in the automotive industry to impart a decorative and/or protective finish to the coated substrate. Accordingly, the present invention is further directed to a substrate coated at least in part with the coating of the present invention, wherein the substrate comprises part of a vehicle. "Vehicle" is used herein in its broadest sense and includes all types of vehicles, such as but not limited to cars, trucks, buses, vans, golf carts, motorcycles, bicycles, railroad cars and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like. Clearcoats will typically be applied to the exterior of a vehicle.

Coil coatings, having wide application in many industries, are also within the scope of the present invention; the present coatings are particularly suitable as coil coatings due to their flexibility, as discussed above. Coil coatings also typically comprise a colorant.

The coatings of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. In certain embodiments, the package is a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. Thus a "food can" includes a "beverage can". The term "metal can(s)" specifically includes food cans and also specifically includes "can ends", which are typically stamped from can end stock and used in conjunction with the packaging of foods and beverages. The term "metal cans" also specifically includes metal caps and/or closures such as bottle caps, screw top caps and lids of any size, lug caps, and the like. Metal cans can be used to hold other items as well as food and/or beverage, including but not limited to personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or exterior of the package. For example, the coating can be rollcoated onto metal used to make three-piece can bodies, two- or three-piece can end stock and/or cap/closure stock. In some embodiments, the coating is applied to a coil or sheet by roll coating; the coating is then cured by radiation and can ends are stamped out and fabricated into the finished product, i.e. can ends. In other embodiments, the coating is applied as a rim coat to the bottom of the can; such application can be by roll coating. The rim coat functions to reduce friction for improved handling during the continued fabrication and/or processing of the can. In certain embodiments, the coating is applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" nonlinear stabilizer, "an" ethylenically unsaturated monomer, and the like, mixtures of these and other components, including mixtures of microparticles, can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined with the scope of the present invention. "Including", "such as", "for example" and like terms means "including/such as/for example but not limited to".

EXAMPLES

The following examples are intended to illustrate the invention and should not be construed as limiting the invention in any way. For example, while many of the examples use allyl methacrylate in the formation of the acrylic stabilizer, other polyfunctional ethylenically unsaturated monomers can be used.

Example 1

Nonlinear Stabilizer Acrylic 1 was Prepared as Follows:

TABLE 1

| Ingredients | Parts by weight |
|---|---|
| Charge #1 | |
| Butyl Acetate | 333.5 |
| Charge #2 | |
| LUPEROX 270[1] | 16.13 |
| Butyl Acetate | 150.13 |
| Charge #3 | |
| Butyl Acrylate | 232.0 |
| Butyl Methacrylate | 537.6 |

TABLE 1-continued

| Ingredients | Parts by weight |
|---|---|
| 2-Hydroxyethyl Methacrylate | 53.8 |
| Styrene | 240.8 |
| Allyl Methacrylate | 11.0 |
| Charge #4 | |
| Butyl Acetate | 21.5 |
| Charge #5 | |
| LUPEROX 270 | 2.15 |
| Butyl Acetate | 10.96 |
| Charge #6 | |
| LUPEROX 270 | 2.15 |
| Butyl Acetate | 10.96 |
| Charge #7 | |
| Butyl Acetate | 5.90 |
| Charge #8 | |
| Butyl Acetate | 197.6 |

[1]LUPEROX 270 is t-butyl-per-3,5,5-trimethylhexanoate, available from Arkema, Inc.

Charge #1 was added into a 3-liter, 4-necked flask equipped with a motor-driven steel stir blade, a thermocouple, a nitrogen inlet, and a water-cooled condenser. The reaction mixture was heated to reflux (approximately 125° C.), by a mantle controlled by the thermocouple via a temperature feedback control device. Charge #2 and #3 were added dropwise via addition funnels over 3 h, while the reaction mixture continued to reflux. After the addition was complete, the addition funnel that had contained Charge #3 was rinsed with Charge #4 into the reaction flask, and the reaction mixture was held at reflux for 30 min Charge #5 was added over 15 min, and the reaction mixture was held at reflux for 30 min Charge #6 was added over 15 min, and then the addition funnel that had contained Charge #6 was rinsed with Charge #7 into the reaction flask. The reaction mixture was held at reflux for 1 h and then Charge #8 was added. The acrylic polymer solution thus obtained had a OH value of 14.59 mg KOH/gram of sample (measured by titration); Mw 51,817 and Mn 8,108 (measured by gel permeation chromatography using polystyrene standards); and a free monomer content of <0.50% (measured by gas chromatography).

Example 2

Nonlinear Stabilizer Acrylic 2 was prepared as described above for Acrylic Example 1 using the materials described in Table 2:

TABLE 2

| Ingredients | Parts by weight |
|---|---|
| Charge #1 | |
| Butyl Acetate | 666.5 |
| Charge #2 | |
| LUPEROX 270 | 32.3 |
| Butyl Acetate | 290.3 |
| Charge #3 | |
| Butyl Acrylate | 464.4 |
| Butyl Methacrylate | 967.5 |
| 2-Hydroxyethyl Methacrylate | 215.0 |
| Styrene | 481.6 |
| Allyl Methacrylate | 21.5 |

TABLE 2-continued

| Ingredients | Parts by weight |
|---|---|
| Charge #4 | |
| Butyl Acetate | 43.0 |
| Charge #5 | |
| LUPEROX 270 | 4.3 |
| Butyl Acetate | 21.9 |
| Charge #6 | |
| LUPEROX 270 | 4.3 |
| Butyl Acetate | 21.9 |
| Charge #7 | |
| Butyl Acetate | 11.8 |
| Charge #8 | |
| Butyl Acetate | 405.2 |

The acrylic polymer solution thus obtained had a OH value of 14.6 mg KOH/gram of sample (measured by titration); Mw 51817 and Mn 8108 (measured by gel permeation chromatography using polystyrene standards); and a free monomer content of <0.5% (measured by gas chromatography).

Example 3

Non-aqueous Dispersion Resin 3 was prepared as follows:

TABLE 3

| Ingredients | Parts by weight |
|---|---|
| Charge #1 | |
| Acrylic from Example 1 | 186.2 |
| Solvent Blend A[2] | 320.6 |
| Charge #2 | |
| LUPEROX 270 | 0.37 |
| Solvent Blend A | 3.70 |
| Charge #3 | |
| Ethyl Acrylate | 36.3 |
| Ethylene Glycol Dimethacrylate | 10.4 |
| 2-Hydroxyethyl Methacrylate | 68.6 |
| Methyl Methacrylate | 130.8 |
| Styrene | 13.0 |
| Charge #4 | |
| LUPEROX 270 | 2.41 |
| Solvent Blend A | 46.0 |
| Charge #5 | |
| Solvent Blend A | 18.5 |
| Charge #6 | |
| LUPEROX 270 | 1.85 |
| Solvent Blend A | 10.0 |
| Charge #7 | |
| Solvent Blend A | 5.0 |
| Charge #8 | |
| Solvent Blend A | 82.9 |

[2]Solvent Blend A was 30% butyl acetate, 10% propylene glycol monomethyl ether, and 60% ISOPAR K (odorless mineral spirits, available from ExxonMobil Chemical Company). The solubility parameters of the stabilizer from Example 1, solvent blend A and core monomers are calculated as 18.2, 16.12 and 20 MPa^0.5, respectively.

Charge #1 was added into a 2-liter, 4-necked flask equipped with a motor-driven steel stir blade, a thermocouple, a nitrogen inlet, and a water-cooled condenser. The reaction mixture was heated to reflux (approximately 135° C.), by a mantle controlled by the thermocouple via a temperature feedback control device. Charge #2 and 7.5% by weight of Charge #3 were added dropwise via addition funnels over 10 min, and then the reaction mixture was held at reflux for 30 min. After the hold, Charge #4 and the remainder of Charge #3 were added over 2 h, while the reaction mixture continued at reflux. After the addition was complete, the addition funnel that had contained Charge #3 was rinsed with Charge #5 into the reaction flask, and the reaction mixture was held at reflux for 1 h. Charge #6 was added over 30 min, and then the addition funnel that had contained Charge #6 was rinsed with Charge #7 into the reaction flask. The reaction mixture was held at reflux for 1 h and then Charge #8 was added. The acrylic polymer solution thus obtained had a milky appearance.

Example 4

Non-aqueous Dispersion Resin 4 was prepared as described above for Non-aqueous Dispersion Resin 3 using the materials described in Table 4:

TABLE 4

| Ingredients | Parts by weight |
|---|---|
| Charge #1 | |
| Acrylic from Example 2 | 189.4 |
| Solvent Blend B[3] | 317.4 |
| Charge #2 | |
| LUPEROX 270 | 0.37 |
| Solvent Blend B | 3.70 |
| Charge #3 | |
| Ethylene Glycol Dimethacrylate | 10.4 |
| 2-Hydroxyethyl Methacrylate | 103.6 |
| Methyl Methacrylate | 125.6 |
| Styrene | 19.4 |
| Charge #4 | |
| LUPEROX 270 | 2.41 |
| Solvent Blend B | 46.0 |
| Charge #5 | |
| Solvent Blend B | 18.5 |
| Charge #6 | |
| LUPEROX 270 | 1.85 |
| Solvent Blend B | 10.0 |
| Charge #7 | |
| Solvent Blend B | 5.0 |
| Charge #8 | |
| Solvent Blend B | 82.8 |

[3]Solvent Blend B was 50% butyl acetate, 10% propylene glycol monomethyl ether, and 40% ISOPAR K (odorless mineral spirits, available from ExxonMobil Chemical Company). The solubility parameters of the stabilizer from Example 2, solvent blend B and core monomers are calculated as 18.6, 16.66 and 21.1 MPa^0.5, respectively.

Example 5

Non-aqueous Dispersion Resin 5 was prepared as described above for Non-aqueous Dispersion Resin 3 using the materials described in Table 5:

TABLE 5

| Ingredients | Parts by weight |
|---|---|
| Charge #1 | |
| Acrylic from Example 2 | 185.0 |
| Solvent Blend A | 321.8 |

TABLE 5-continued

| Ingredients | Parts by weight |
|---|---|
| Charge #2 | |
| LUPEROX 270 | 0.37 |
| Solvent Blend A | 3.70 |
| Charge #3 | |
| Ethylene Glycol Dimethacrylate | 10.4 |
| 2-Hydroxyethyl Methacrylate | 155.4 |
| Methyl Methacrylate | 77.7 |
| Styrene | 15.5 |
| Charge #4 | |
| LUPEROX 270 | 2.41 |
| Solvent Blend A | 46.0 |
| Charge #5 | |
| Solvent Blend A | 18.5 |
| Charge #6 | |
| LUPEROX 270 | 1.85 |
| Solvent Blend A | 10.0 |
| Charge #7 | |
| Solvent Blend A | 5.0 |
| Charge #8 | |
| Solvent Blend A | 82.9 |

The solubility parameters of the stabilizer from Example 2, solvent blend A and core monomers are calculated as 18.6, 16.12 and 22.5 MPa^0.5, respectively.

Example 6

Non-aqueous Dispersion Resin 6 was prepared as described above for Non-aqueous Dispersion Resin 3 using the materials described in Table 6:

TABLE 6

| Ingredients | Parts by weight |
|---|---|
| Charge #1 | |
| Acrylic from Example 2 | 185.0 |
| Solvent Blend A | 321.8 |
| Charge #2 | |
| LUPEROX 270 | 0.37 |
| Solvent Blend A | 3.70 |
| Charge #3 | |
| Ethylene Glycol Dimethacrylate | 10.4 |
| 2-Hydroxyethyl Methacrylate | 207.2 |
| Styrene | 41.4 |
| Charge #4 | |
| LUPEROX 270 | 2.41 |
| Solvent Blend A | 46.0 |
| Charge #5 | |
| Solvent Blend A | 18.5 |
| Charge #6 | |
| LUPEROX 270 | 1.85 |
| Solvent Blend A | 10.0 |
| Charge #7 | |
| Solvent Blend A | 5.0 |
| Charge #8 | |
| Solvent Blend A | 82.9 |

The solubility parameters of the stabilizer from Example 2, solvent blend A and core monomers are calculated as 18.6, 16.12 and 24.1 MPa^0.5, respectively.

Example 7

Non-aqueous Dispersion Resin 7 was prepared as described above for Non-aqueous Dispersion Resin 3 using the materials described in Table 7:

TABLE 7

| Ingredients | Parts by weight |
|---|---|
| Charge #1 | |
| Acrylic from Example 2 | 185.0 |
| Solvent Blend A | 321.8 |
| Charge #2 | |
| LUPEROX 270 | 0.37 |
| Solvent Blend A | 3.70 |
| Charge #3 | |
| Ethyl Acrylate | 41.4 |
| Ethylene Glycol Dimethacrylate | 10.4 |
| 2-Hydroxyethyl Methacrylate | 68.6 |
| Methyl Methacrylate | 125.6 |
| Styrene | 13.0 |
| Charge #4 | |
| LUPEROX 270 | 2.41 |
| Solvent Blend A | 46.0 |
| Charge #5 | |
| Solvent Blend A | 18.5 |
| Charge #6 | |
| LUPEROX 270 | 1.85 |
| Solvent Blend A | 10.0 |
| Charge #7 | |
| Solvent Blend A | 5.0 |
| Charge #8 | |
| Solvent Blend A | 82.9 |

The solubility parameters of the stabilizer from Example 2, solvent blend A and core monomers are calculated as 18.6, 16.12 and 20 MPa^0.5, respectively.

Example 8

Nonlinear Stabilizer Acrylic 8 was prepared as follows:

TABLE 8

| Ingredients | Parts by weight |
|---|---|
| Charge #1 | |
| Solvent Blend C[4] | 504.8 |
| Charge #2 | |
| VAZO-67[5] | 16.13 |
| Charge #3 | |
| Butyl Acrylate | 57.9 |
| Butyl Methacrylate | 270.0 |
| 2-Hydroxyethyl Acrylate | 48.3 |
| Styrene | 100.6 |
| Acrylic Acid | 10.3 |
| Allyl Methacrylate | 5.0 |
| Charge #4 | |
| LUPEROX 26[6] | 2.0 |
| Charge #5 | |
| LUPEROX 26 | 2.0 |

[4]Solvent Blend C was 38.5% heptane, 35.6% xylene, 20.9% butyl acetate, and 5% exempt mineral spirits (commercially available as VARSOL 18 from ExxonMobil Chemical Company).
[5]VAZD-67 is azo-bis-2,2'-methylbutyronitrile, available from Akzo Chemicals, Inc.
[6]LUPEROX 26 is t-butyl-peroctoate, available from Arkema, Inc.

Charge #1 was added into a 2-liter, 4-necked flask equipped with a motor-driven steel stir blade, a thermocouple, a nitrogen inlet, and a water-cooled condenser. The reaction mixture was heated to reflux (approximately 106° C.), by a mantle controlled by the thermocouple via a temperature feedback control device. Charge #2 and #3 were added dropwise via addition funnels over 3 h, while the reaction mixture continued to reflux. After the addition was complete, the reaction mixture was held at reflux for 30 min. Charge #4 was added over 5 min, and the reaction mixture was held at reflux for 30 min. Charge #5 was added over 5 min, and then the reaction mixture was held at reflux for 1 h. The acrylic polymer solution thus obtained had Mw 20,334 and Mn 4,843 (measured by gel permeation chromatography using polystyrene standards).

Example 9

Non-aqueous Dispersion Resin 9 was prepared as follows:

TABLE 9

| Ingredients | Parts by weight |
|---|---|
| Charge #1 | |
| Acrylic from Example 8 | 186.2 |
| Solvent Blend C | 320.6 |
| Charge #2 | |
| VAZO-67 | 0.37 |
| Solvent Blend C | 3.70 |
| Charge #3 | |
| Ethyl Acrylate | 41.4 |
| Glycidyl Methacrylate | 3.9 |
| 1,6-Hexanediol Diacrylate | 5.2 |
| 2-Hydroxyethyl Acrylate | 64.8 |
| Methyl Methacrylate | 130.8 |
| Styrene | 13.0 |
| Charge #4 | |
| VAZO-67 | 2.41 |
| Solvent Blend C | 46.0 |
| Charge #5 | |
| Solvent Blend C | 18.5 |
| Charge #6 | |
| VAZO-67 | 1.85 |
| Solvent Blend C | 10.00 |
| Charge #7 | |
| Solvent Blend C | 5.0 |
| Charge #8 | |
| Solvent Blend C | 82.9 |

The solubility parameters of the stabilizer from Example 8, solvent blend C and core monomers are calculated as 18.8, 16.46 and 20.3 MPa 0.5, respectively.

Charge #1 was added into a 2-liter, 4-necked flask equipped with a motor-driven steel stir blade, a thermocouple, a nitrogen inlet, and a water-cooled condenser. The reaction mixture was heated to reflux (approximately 114° C.), by a mantle controlled by the thermocouple via a temperature feedback control device. Charge #2 and 7.5% by weight of Charge #3 were added dropwise via addition funnels over 10 min, and then the reaction mixture was held at reflux for 30 min. After the hold, Charge #4 and the remainder of Charge #3 were added over 2 h, while the reaction mixture continued at reflux. After the addition was complete, the addition funnel that had contained Charge #3 was rinsed with Charge #5 into the reaction flask, and the reaction mixture was held at reflux for 1 h. Charge #6 was added over 30 min, and then the addition funnel that had contained Charge #6 was rinsed with Charge #7 into the reaction flask. The reaction mixture was held at reflux for 1 h and then Charge #8 was added. The acrylic polymer solution thus obtained had a milky appearance.

Example 10

NAD Resin in Solvent Basecoat

A silver metallic solvent basecoat containing the non-aqueous dispersion ("NAD resin") of the present invention was made according to Example B in Table 10. The comparative standard basecoat composition is shown as Example A. The basecoats were spray applied onto 4 inch by 12 inch steel panels that were coated with commercially available and cured PPG ELECTROCOAT (ED 6060C) and PRIMER (HP 77224ER). The substrate panels were obtained from ACT Test Panels, Inc. of Hillsdale, Mich. The basecoats were applied in two coats. A three minute room temperature flash was allowed before two coats of a commercially available PPG Clear (HIGH TECH) were applied onto each basecoat. A one minute room temperature flash was allowed between coats of clear. The composite coating was allowed to flash for ten minutes at room temperature before baking for thirty minutes at 285° F.

TABLE 10

| Component | Example A | Example B |
|---|---|---|
| Ethyl 3-Ethoxypropionate[7] | 40.0 | 40.0 |
| AROMATIC 100[8] | 25.0 | 25.0 |
| Butyl Acetate[9] | 50.0 | 35.0 |
| Acrylic Microgel Resin[10] | 26.0 | 26.0 |
| CAB 381-20 Solution[11] | 22.2 | 22.2 |
| Polyester Resin[12] | 84.0 | 52.0 |
| NAD Resin[13] | 0 | 48.5 |
| Dow Corning 56 Solution[14] | 2.2 | 2.2 |
| LUWIPAL 018 Melamine Resin[15] | 34.2 | 34.2 |
| RESAMIN HF 480 Resin[16] | 5.0 | 5.0 |
| Aluminum Paste 634A[17] | 16.9 | 16.9 |
| CERAFAX 106A[18] | 64.7 | 64.7 |
| TOTAL (grams) | 370.2 | 371.7 |

[7]Solvent, available from EASTMAN CHEMICAL.
[8]Solvent, available from EXXON Corporation.
[9]Solvent, available from EASTMAN CHEMICAL.
[10]Acrylic micro-particle as described in Example II of U.S. Pat. No. 4,147,688A.
[11]Cellulose Acetate Butyrate Resin, available from EASTMAN CHEMICAL dispersed in (77.4/13.6 ratio) Butyl Acetate and Butanol to a 9% solution.
[12]Polyester resin: 39% Neopentyl Glycol, 34% Isophthalic Acid, 17% Adipic Acid and 10% Trimethylol Propane with a Weight Average Molecular Weight of 10,900. The resin was made to 62.4% weight solids in 83% SOLVESSO 100/10% DOWANOL PM/7% XYLENE solvent blend.
[13]NAD Resin: 35.4% Methyl Methacrylate, 17.5% Hydroxy Ethyl Acrylate, 10.6% Ethyl Acrylate, 3.5% Styrene, 2.0% Hexanediol Diacrylate, 1% Glycidyl Methacrylate and 30% of an acrylic stabilizer with the composition consisting of 55% Butyl Methacrylate, 20.4% Styrene, 11.6% Butyl Acrylate, 10% Hydroxy Ethyl Acrylate, 2% Acrylic Acid and 1% Allyl Methacrylate. The stabilizing acrylic had a weight average molecular weight of 20,300. The NAD was made to 41.2% weight solids using a solvent blend consisting of 39% Heptane, 36% Xylene, 20% Butyl Acetate and 5% Mineral Spirits. The acrylic stabilizer and NAD Resin were made as generally described in the above examples.
[14]Silicone Fluid available from DOW CORNING Corporation dispersed in AROMATIC 100 to a 10% solution.
[15]Melamine-Formaldehyde resin solution available from BASF Corporation.
[16]Butylurethane-Formaldehyde resin solution available from CYTEC SURFACE SPECIALTIES.
[17]Aluminum Paste available from TOYO ALUMINUM K.K.
[18]Wax dispersed in solvent available from BYK-CERA B.V.

Table 11 provides a summary of the appearance, solids and physical properties obtained for the basecoat containing the present NAD resin compared to the standard basecoat (Example A) using only polyester resin. The Examples show that the basecoat containing NAD resin is equivalent or slightly better for color, application solids and final appearance compared to the standard basecoat.

TABLE 11

| | | | | | | | | | BYK | |
|---|---|---|---|---|---|---|---|---|---|---|
| | Viscosity # 4 Ford | | | % Theory | X-Rite Color[20] | | | | WAVESCAN[23] | |
| | Cup | DFT[19] (mils) | | Weight | Flop | | | 20° | Long | Short |
| Example | (seconds) | Base | Clear | Solids | Index | L15 | L110 | Gloss[21] DOI[22] | Wave | Wave |
| A | 15.2 | 0.64 | 1.73 | 30.3 | 11.6 | 130.9 | 31.7 | 99      90 | 8.2 | 18.1 |
| B | 15.8 | 0.63 | 1.72 | 30.2 | 11.9 | 131.9 | 31.3 | 99      91 | 7.1 | 16.1 |

[19]Dry film thickness measured using FISCHER DELTACOPE made by FISCHER TECHNOLOGY, INC. of Windsor, CT.
[20]X-Rite Color Instrument model number MA68II manufactured by X-Rite, Inc. of Grandville, Michigan.
[21]NOVO GLOSS statistical 20° Glossmeter available from Paul N. Gardner Company, Inc. of Pompano Beach, Florida.
[22]DOI meter manufactured by TRICOR Systems, Inc. of Elgin, Illinois.
[23]BYK WAVESCAN DOI instrument manufactured by BKY Gardner USA of Columbia, Maryland.

Example 11

Coatings were prepared from the NAD resins prepared as described above in Examples 3 through 7. Materials were added in order from top to bottom in Table 12 under agitation in half pint cans. All coatings were formulated with PHENODUR PR 516/60B, from Cytec Surface Specialties, Inc., at 20% by weight on coating non-volatiles, and catalyzed with phosphoric acid, from Acros Organics, diluted to 10% by weight with isopropanol.

TABLE 12

| Coating Example # | C | D | E | F | G |
|---|---|---|---|---|---|
| NAD Resin Example #3 | 69.74 | — | — | — | — |
| NAD Resin Example #4 | — | 69.74 | — | — | — |
| NAD Resin Example #5 | — | — | 69.74 | — | — |
| NAD Resin Example #6 | — | — | — | 69.74 | — |
| NAD Resin Example #7 | — | — | — | — | 66.81 |
| Butyl Cellosolve | 16.88 | 16.88 | 16.88 | 16.88 | 19.80 |
| PHENODUR PR 516 | 11.58 | 11.58 | 11.58 | 11.58 | 11.58 |
| Phosphoric acid (10%) | 1.81 | 1.81 | 1.81 | 1.81 | 1.81 |
| Totals | 100 | 100 | 100 | 100 | 100 |

All coatings were applied at 35% weight solids. Coatings were prepared by drawing the coatings over tin free steel using a #12 wire wound rod and baking them at 400 F for 12 minutes. All coatings had a resultant dry coating weight of approximately 4 milligrams/square inch. Coatings were evaluated for their resistance to methyl ethyl ketone solvent by dousing a rag with the solvent and index finger rubbing it across the coating surface until the rag broke through the coating to the metal surface. The rag was re-doused with the solvent every fifty double rubs across the coating surface. The number of double rubs to break through the coating to the metal surface was recorded for a maximum of 200 double rubs. Coating flexibility was evaluated in triplicate by a wedge bend test. A 4.5 inch long by 2 inch wide coated coupon was cut from the coated panel to intentionally have the metal grain run perpendicular to the length of the coated wedge bend test coupon. The length of the coupon was then bent over a ¼ inch metal dowel with the coated side out, and then placed in a piece of metal where a wedge had been removed to result in, after being impacted by approximately a 2000 gram weight approximately 12 inches above the bent coupons, one end of the coupon to touch or impinge upon itself and the other end to stay open to the ¼" dowel bend. After being impacted, all bent coupons were immersed in a 10% aqueous solution of cuprous sulfate for two minutes to etch the exposed metal substrate to facilitate rating them. Using an I.0× microscope, coating flex was evaluated by measuring along the length of the bent coupon to the last area that had any open cracks or spotty failure from the impinged end. Reported % flex failed=(length of last crack or open spot/length of the entire coupon)×100. Coatings were also evaluated for their sterilization resistance to common food simulants like salt (2% by weight) and acid/salt (3% salt/2% acetic acid and 1% salt/1% citric acid) aqueous solutions. The sterilization conditions were 130° C. for 60 minutes, and after sterilization, all coatings were rated for one or more of: adhesion 0 (nothing stuck)-100% (nothing removed) using 3M's Scotch 610 tape; blush 0 (clear)-4 (opaque); blister 0 (none)-4 (dense); and corrosion 0 (none)-4 (severe). The coatings of the present invention were compared to a standard epoxy control, PPG2004877 available from PPG Industries, Inc.

TABLE 13

| Paint | MEK double | Wedge Flex, % failed | | | 2% Salt | | | 3% Salt/2% Acetic | | | | 1% Salt/1% Citric | | |
|---|---|---|---|---|---|---|---|---|---|---|---|---|---|---|
| Example | rubs | 1 | 2 | 3 | Adh. | Blush | Corr. | Adh. | Blush | Blister | Corr. | Adh. | Blush | Blister |
| Epoxy Control | 200 | 9 | 8 | 10 | 100 | 1.0 | 0.5 | 100 | 1.5 | 0.0 | 1.5 | 100 | 0.5 | 0.0 |
| C | 10 | 39 | 29 | 52 | 75 | 0.5 | 0.5 | 100 | 1.0 | 0.0 | 1.5 | 100 | 0.5 | 0.0 |
| D | 145 | 14 | 9 | 10 | 90 | 0.5 | 0.5 | 100 | 1.0 | 0.0 | 1.0 | 100 | 1.0 | 0.0 |
| E | 85 | 13 | 12 | 17 | 99 | 0.5 | 0.0 | 100 | 1.0 | 0.0 | 1.0 | 100 | 0.5 | 0.0 |
| F | 45 | 14 | 5 | 10 | 100 | 0.5 | 0.0 | 100 | 1.0 | 0.0 | 1.0 | 100 | 0.5 | 0.0 |
| G | 55 | 23 | 15 | 18 | 75 | 1.0 | 0.5 | 100 | 1.5 | 0.0 | 1.5 | 100 | 1.0 | 0.0 |

As can be seen from Table 13, coatings made from non-aqueous dispersions according to the present invention, particularly those with high polar monomer content in the stabilizer and the core, mimic epoxy coating performance by having good flexibility, adhesion, and resistance to blush, and to blistering in brines and acidic brines. This example also shows that high polar content NADs do not need large amounts of external crosslinkers to match the epoxy resistance properties as required by other BPA free technologies.

Whereas particular embodiments of this invention have been described above for purposes of illustration, it will be evident to those skilled in the art that numerous variations of the details of the present invention may be made without departing from the invention as defined in the appended claims.

What is claimed is:

1. A non-aqueous dispersion comprising the dispersion polymerization reaction product of an ethylenically unsaturated monomer and a nonlinear, random, acrylic polymer stabilizer, wherein the acrylic stabilizer comprises 0.25 to 5 weight % polyfunctional monomer, where weight % is based on the total weight of monomers used in the stabilizer.

2. The dispersion of claim 1 wherein the polyfunctional monomer comprises a polyfunctional ethylenically unsaturated monomer.

3. The dispersion of claim 2, wherein the polyfunctional ethylenically unsaturated monomer comprises allyl (meth)acrylate.

4. The dispersion of claim 2, wherein the polyfunctional ethylenically unsaturated monomer comprises alkane diol di(meth)acrylate.

5. The dispersion of claim 1, wherein the nonlinear acrylic stabilizer comprises 90 weight % or greater acrylic.

6. The dispersion of claim 5, wherein the nonlinear acrylic stabilizer comprises 95 weight % or greater acrylic.

7. The dispersion of claim 1, wherein the non-aqueous dispersion has an average particle size of one micron or less.

8. The dispersion of claim 1, having a gel content as measured by the ultracentrifuge separation method of 30 weight percent or greater, with weight percent based on total solid weight.

9. The dispersion of claim 1, wherein the van Krevelen solubility parameter of the stabilizer at 298 K, as calculated from the weighted average of the solubility parameter of the individual monomers, is 17 to 28 MPa^0.5.

10. The dispersion of claim 1, wherein the dispersion further comprises a carrier and the solubility parameter of the carrier, as calculated from the weighted average of the solubility parameter at 298 K of each solvent, is lower than that of the stabilizer by 3 MPa^0.5 or less.

11. The dispersion of claim 10, wherein the van Krevelen solubility parameter of the ethylenically unsaturated monomer, as calculated from the weighted average of the solubility parameter of the individual monomers, is greater than that of the carrier by 3 MPa^0.5 or greater.

12. The dispersion of claim 1, wherein the dispersion further comprises a carrier comprising butyl acetate, propylene glycol monomethyl ether, and/or an aliphatic hydrocarbon.

13. The dispersion of claim 1, wherein less than 50 weight % of the ethylenically unsaturated monomers in the nonlinear acrylic stabilizer comprise polar and/or functional monomers.

14. The dispersion of claim 1, wherein the ethylenically unsaturated monomer that reacts with the stabilizer comprises, hydroxyl (meth)acrylate, di(meth)acrylate, alkyl (meth)acrylate, and/or styrene.

15. The dispersion of claim 14, wherein the alkyl (meth)acrylate comprises butyl (meth)acrylate and/or methyl (meth)acrylate.

* * * * *